United States Patent
Loucks

(10) Patent No.: US 7,499,282 B1
(45) Date of Patent: Mar. 3, 2009

(54) SUCCESSIVELY LAYERED MODULAR CONSTRUCTION FOR A PORTABLE COMPUTER SYSTEM

(75) Inventor: Jeffry Harlow Loucks, Gig Harbor, WA (US)

(73) Assignee: Palm, Inc., Sunnyvale, CA (US)

( * ) Notice: Subject to any disclaimer, the term of this patent is extended or adjusted under 35 U.S.C. 154(b) by 527 days.

(21) Appl. No.: 09/957,090

(22) Filed: Sep. 19, 2001

(51) Int. Cl.
  *H05K 5/00* (2006.01)
(52) U.S. Cl. .................. 361/730; 361/790; 361/735
(58) Field of Classification Search ............. 361/686, 361/683, 680, 790, 735, 301.4; 710/303; 257/686
See application file for complete search history.

(56) References Cited

U.S. PATENT DOCUMENTS

| | | | |
|---|---|---|---|
| 4,359,222 A | | 11/1982 | Smith, III et al. |
| 4,972,496 A | | 11/1990 | Sklarew |
| 5,179,502 A | | 1/1993 | Matsuda |
| 5,246,105 A | * | 9/1993 | Eykmann et al. ........... 206/63.5 |
| 5,264,992 A | | 11/1993 | Hogdahl et al. |
| 5,294,994 A | | 3/1994 | Robinson et al. |
| 5,299,265 A | | 3/1994 | Hayama et al. |
| 5,579,487 A | | 11/1996 | Meyerson et al. |
| 5,590,027 A | | 12/1996 | Provenzale |
| 5,612,732 A | | 3/1997 | Yuyama et al. |
| 5,645,434 A | * | 7/1997 | Leung ........................... 439/74 |
| 5,657,459 A | | 8/1997 | Yanagisawa et al. |
| 5,666,273 A | | 9/1997 | Kurcbart |
| 5,677,830 A | * | 10/1997 | Nogas et al. ................ 361/790 |
| 5,718,023 A | | 2/1998 | Billish |
| 5,764,221 A | * | 6/1998 | Willard ....................... 345/173 |
| 5,793,352 A | | 8/1998 | Greenberg et al. |
| 5,847,698 A | | 12/1998 | Reavey et al. |
| 5,850,059 A | | 12/1998 | Yoshimura |
| 5,864,467 A | * | 1/1999 | Recchia et al. ............... 361/732 |
| 5,889,512 A | | 3/1999 | Moller et al. |
| 5,949,408 A | | 9/1999 | Kang et al. |
| 5,949,644 A | * | 9/1999 | Park ........................... 361/686 |
| 5,988,511 A | * | 11/1999 | Schmidt et al. ............. 235/492 |
| 6,027,828 A | * | 2/2000 | Hahn ........................... 429/100 |
| 6,059,614 A | * | 5/2000 | Shelby et al. ................ 439/717 |
| 6,079,993 A | | 6/2000 | Laine |
| 6,094,565 A | | 7/2000 | Alberth et al. |
| 6,137,686 A | * | 10/2000 | Saye .......................... 361/732 |
| 6,282,082 B1 | | 8/2001 | Armitage et al. |
| 6,308,377 B1 | | 10/2001 | Maatta |
| 6,315,582 B1 | | 11/2001 | Nishio et al. |
| 6,327,152 B1 | | 12/2001 | Saye |
| 6,330,144 B1 | | 12/2001 | Lee et al. |
| 6,505,087 B1 | * | 1/2003 | Lucas et al. ................... 700/83 |

(Continued)

Primary Examiner—Hung S Bui

(57) ABSTRACT

A modular portable computer system is described. In one embodiment, the present invention is comprised of a top modular layer with a coupled display interface and adapted to be interconnected with other modular layers. In the present embodiment, a second modular layer is interconnected with the top modular layer and other modular layers, for providing a power source to supply operating power to said top modular layer and to those other modular layers present and is disposed beneath the top modular layer. In the present embodiment, a third modular layer is interconnected with the top modular layer and the second modular layer for providing baseline logic electronics and communication components to the modular portable computer system and is disposed beneath the top modular layer. In the present embodiment, a universal interconnect for providing electronic and communicative interconnection of each modular layer is disposed at least once on each modular layer.

32 Claims, 12 Drawing Sheets

U.S. PATENT DOCUMENTS

| | | |
|---|---|---|
| 6,573,843 B1 | 6/2003 | Murphy |
| 6,607,408 B2 * | 8/2003 | Milan ....................... 439/752.5 |
| 6,698,851 B1 * | 3/2004 | Ludl ........................... 312/108 |
| 6,703,962 B1 | 3/2004 | Marics et al. |
| 6,839,238 B2 | 1/2005 | Derr et al. |
| 2002/0176223 A1 * | 11/2002 | Shiozaki ..................... 361/636 |
| 2003/0007321 A1 * | 1/2003 | Dayley ....................... 361/683 |

* cited by examiner

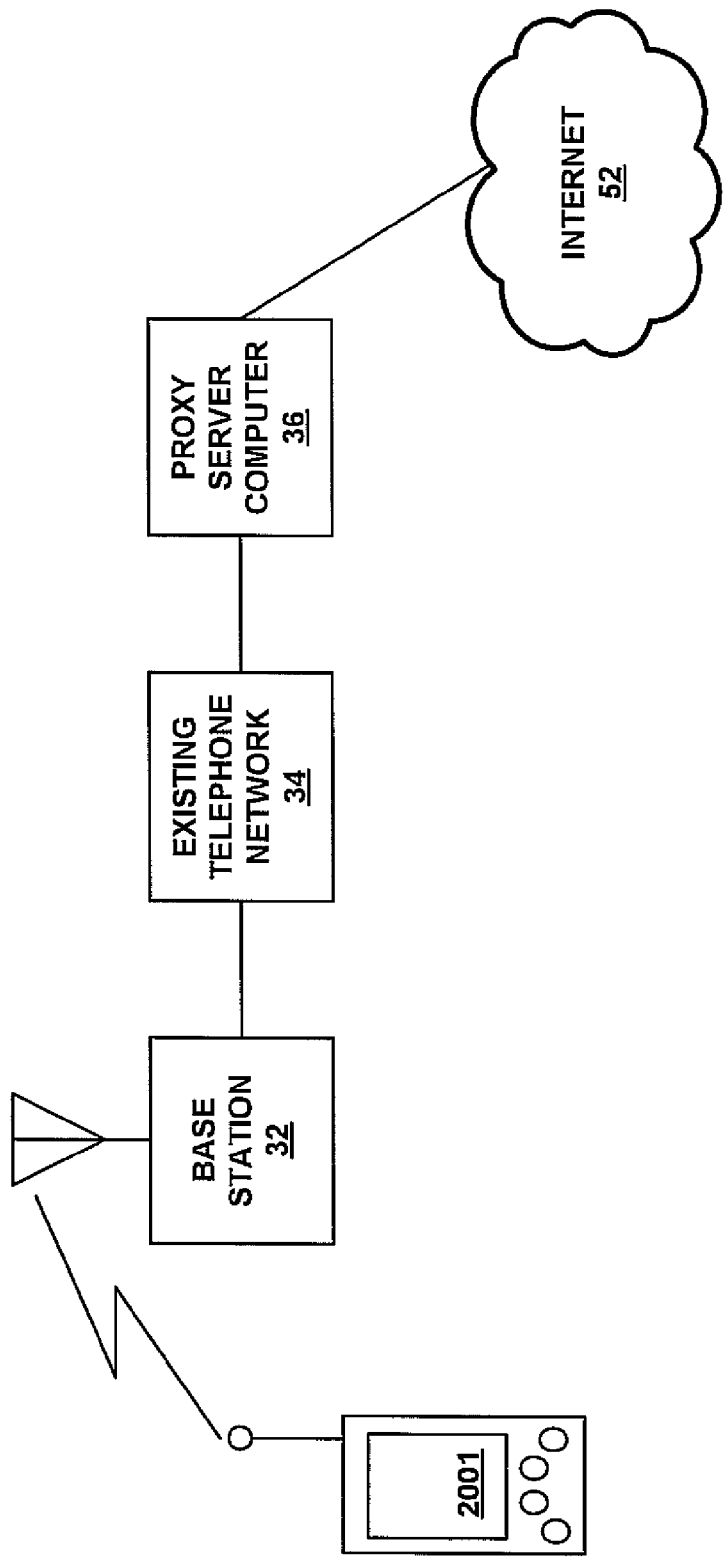

2001

SUCCESSIVELY LAYERED MODULAR CONSTRUCTION FOR A PORTABLE COMPUTER SYSTEM

FIELD OF THE INVENTION

Embodiments of the present invention relate to portable computer systems such as a handheld computer or PDA (personal digital assistant). More particularly, embodiments of the present invention provide a layered modular construction of a computer system.

BACKGROUND OF THE INVENTION

As the continuing advances in technology have enabled the further miniaturization of the components required to build computer systems, new categories of computer systems have been created. One of the newer categories of computer systems developed has been the portable, hand held, or "palmtop" computer system, referred to as a personal digital assistant or PDA. Other examples of a palmtop computer system include electronic address books, electronic day planners, electronic schedulers and the like.

A palmtop computer system is a computer that is small enough to be held in the user's hand and as such is "palm-sized." As a result, palmtops are readily carried about in the user's briefcase, purse, and in some instances, in the user's pocket. By virtue of its size, the palmtop computer, being inherently lightweight, is therefore exceptionally portable and convenient.

With the exception of cosmetic considerations, such as having an interchangeable face plate that is available in assorted colors, most palmtop computer systems lack hardware configurability and/or expandability. For example, when a consumer acquires a palmtop computer system, such as portable computer system 2 of FIG. 1, they must decide on a myriad of configurations. The display panel 5 on one palmtop computer may have a black and white display panel while another is equipped with a color display. One palmtop computer may be equipped with wireless communication functionality while another is not so equipped. Another palmtop computer may have an expansion slot for additional data storage and functionality while a similar model is not so configured. Regardless of the components and/or configurations, the portable computer system is generally integrated into one singularly encased device. While this configuration is more that adequate for many users, other users may desire more expandability and configuration.

One drawback to the singularly encased device is that once a consumer has made their choice as to which portable computer to acquire, there is almost no possibility of upgrading, such as upgrading a black and white display to a color display, etc.

There are examples of aftermarket components and devices, such as an external modem, that provides added functionality to a portable computer system. These aftermarket products are designed to be coupled to a palmtop computer, commonly utilizing a wired interface externally disposed on a portable computer system. However, these components or devices designed for use with the palmtop computer lack flexibility in expansion choices. For instance, if a user wished to add camera functionality to the palmtop computer, or an MP3 player, the palmtop computer may use the same interface. While having a single communication interface is sufficient for many, others might find it too limiting for their needs.

Additionally, the devices do not provide a universal component aggregation method, interconnection, or profile. For example, one peripheral device may require one type of connection while another peripheral device may require a completely different connection.

Further, some hand held devices do not provide sufficient power for a significant aggregation of functions. It is well known that most palmtop computers are powered by rechargeable or disposable batteries. Because of the reduced size of the palmtop computer, smaller batteries are being utilized to comply with the diminutive size of the portable computer system. This means that as more and more peripheral devices are developed for the palmtop computer, there is an ever increasing demand on the power supply in the palmtop computer.

Additionally, expansion mechanisms tend to be the wrong shape or have the wrong profile, the wrong place, or have inconvenient attachment methods. Also, attaching a peripheral component inconveniently transforms the device and can, in some instances, make the handheld not handholdable.

In addition, because of the increased demands upon the portable computing device, larger data storage capacities are being required. In one instance, an external storage device is coupled to the portable computer system to provide additional data storage capacity. However, because the device is externally disposed, it too must be coupled to the communication interface for interconnection. This would preclude another device from operating from the same communication interface.

Additionally, at present, there is no easy manner in which the electronic components and the related circuitry within the palmtop computer can be upgraded. For example, the CPU (central processing unit) of a palmtop computer is not upgradeable. Further, it is difficult to increase the amount of ROM (read only memory) or RAM (random access memory) within the palmtop computer without either sending the entire computer to the company for costly major repairs or acquiring a newer model which is equipped with larger amounts of RAM and ROM and may have a faster processor.

SUMMARY OF THE INVENTION

Thus a need exists for a palmtop computer system that utilizes modular component construction. An additional need exists for a portable computer system which provides additional modules to be added in an easy and seamless manner. Another need exists for a portable computer system that provides an increasing amount of supplied power to additional modules when coupled to the portable computer system. Yet another need exists for a portable computer system which provides for universal interconnection and interchangeability of the components and which further provides for user defined configuration and positioning of those modules. A further need exists for a palmtop computer system that provides modules that when interconnected are form factor compatible, and can be user stackable.

These and other objects and advantages of the present invention will no doubt become obvious to those of ordinary skill in the art after having read the following detailed description of the preferred embodiments which are illustrated in the various drawing figures.

Accordingly, embodiments of the present invention provide a portable computer system constructed using successively layered modular components. The embodiments further provide a portable computer system which achieves the above listed accomplishment and which further provides additional modular layers to be added in an easy and seamless manner. The embodiments further provide a portable computer system which achieves the above and which further provide an increasing amount of power to additional modular layers when coupled to the portable computer system. The embodiments also provide a portable computer system which achieves the above and which further provide for universal interconnection and interchangeability of the modular layers and which further provides for user defined configuration and positioning of those modules which may be user stackable. The embodiments additionally provide a portable computer system which achieves the above and which further provide modules that, when interconnected, are form factor compatible, have universal connections and universal profile adaptability.

More specifically, the present invention provides a portable computer system that is modularly constructed. In one embodiment, the portable computer system is comprised of a top modular layer. The top modular layer has a display interface viewably coupled therewith and adapted to be communicatively and electrically interconnected with other modular layers. In one embodiment, the portable computer system is further comprised of a second modular layer communicatively and electrically interconnected with the top modular layer and with other modular layers, when other modular layers are present. The second modular layer is for providing a power source to supply operating power to said top modular layer and to those other modular layers, when present. In the present embodiment, the second modular layer is disposed beneath the top modular layer.

In one embodiment, the portable computer system is further comprised of a third modular layer communicatively and electrically interconnected with the top modular layer and the second modular layer. The third modular layer provides the baseline logic electronics and communication components of said portable computer system. The third modular layer is disposed beneath said top modular layer. In the present embodiment, the portable computer system is further comprised of a universal interconnect for providing electronic and communicative interconnection of each modular layer with the other modular layers. The universal interconnect is disposed at least once on each modular layer, thereby enabling full electronic and communicative interconnection between the modular layers.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2A is a block diagram of an exemplary network environment including a portable computer system, in accordance with one embodiment of the present invention.

DETAILED DESCRIPTION

Figure 1:
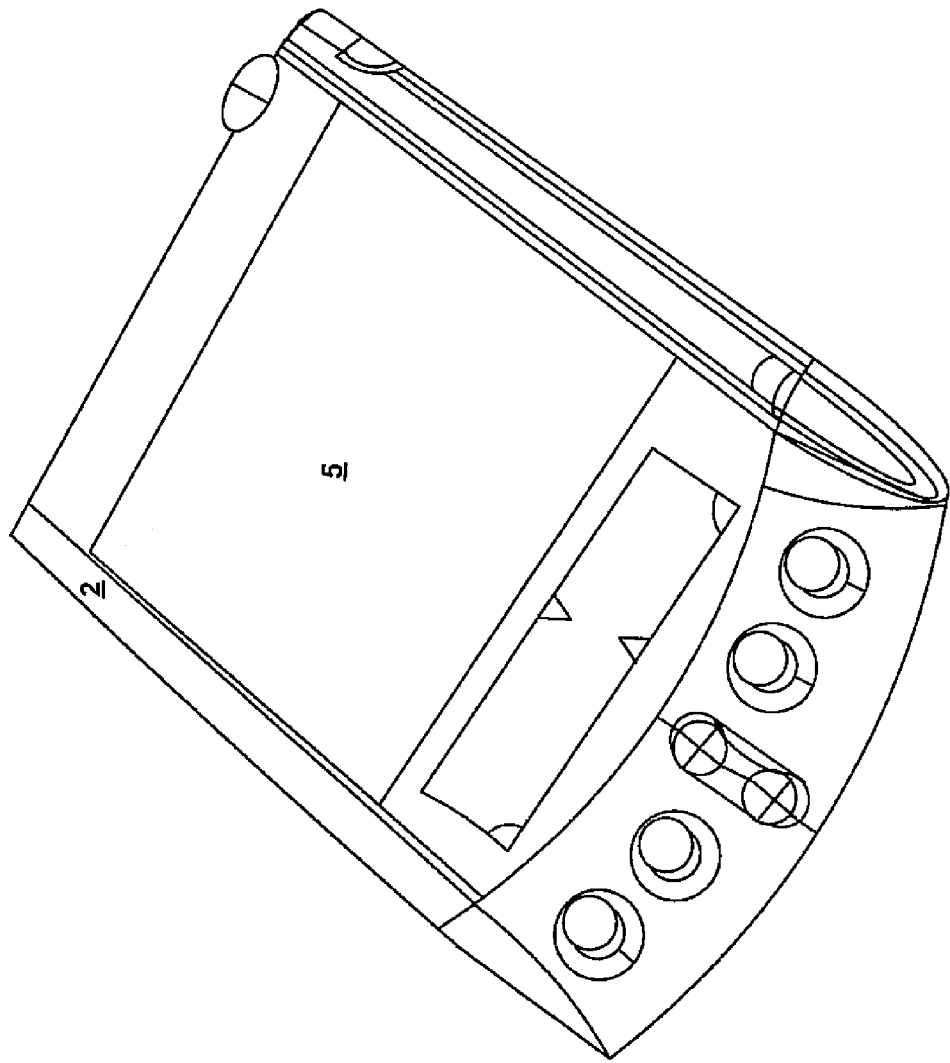
FIG. 1 (Prior Art) is an front-view illustration of a palmtop computer.

A modular palmtop computer system is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Exemplary Network Platform

An embodiment of the present invention is discussed primarily in the context of a portable computer system, such as a palmtop or personal digital assistant. However, it is appreciated that the present invention can be implemented with other types of devices that may be manufactured utilizing modular component construction, and that which have the capability to access some type of central device or central site, including but not limited to palmtop computer systems, pagers, cellular phones, etc.

It should be appreciated that with reference to the present invention, the acronym, MPCS, and the term, modular portable computer system, which the acronym represents, will be interchangeably used throughout.

FIG. 2A is a block diagram of an exemplary network environment 50 including a modular portable computer system 2001 in accordance with one embodiment of the present invention. Modular portable computer system 2001 is also known as a palmtop or palm-sized computer system. In one embodiment, modular portable computer system 2001 has the ability to transmit and receive data and information over a wireless communication interface (e.g., a radio interface). For purposes of the present application, the term "portable computer system" is not intended to be limited solely to conventional palmtop or portable computers. Instead, the term "portable computer" or "portable computer system" is also intended to include any mobile electronic device. Such mobile devices include but are not limited to pagers and paging systems, wireless and cellular telephones, electronic address books, and numerous other mobile devices which may have the ability to wirelessly communicate with a network. As such, for purposes of the present application, the terms "portable computer" and "mobile device" will be considered synonymous and will be used interchangeably.

Base station 32 can be both a transmitter and receiver base station, which can be implemented by coupling it into an existing public telephone network 34. Implemented in this manner, base station 32 enables modular portable computer system 2001 to communicate with a proxy server computer system 36, which is coupled by wire to the existing public telephone network 34. Furthermore, proxy server computer system 36 is coupled to the Internet 52, thereby enabling MPCS (modular portable computer system) 2001 to communicate with the Internet 52. When communicating with a Web site over Internet 52, protocols such as CTP (Compact Transport Protocol), WAP (Wireless Markup Protocol), and markup languages such as CML (Compact Markup Language), WML (Wireless Markup Language) which includes HDML (Handheld Device Markup Language), and XML (Extensible Markup Language) can be used by modular portable computer system 2001 in the present embodiment.

It should be appreciated that one of the functions of proxy server 36 is to perform operations over the Internet 52 on behalf of modular portable computer system 2001. For example, proxy server 36 has a particular Internet address and acts as a proxy device for modular portable computer system 2001 over the Internet 52.

It should be further appreciated that other embodiments of a communications network may be utilized in accordance with the present invention. For example, a wireless connection may be made from modular portable computer system 2001 directly to the Internet 52.

The data and information which are communicated between base station 32 and modular portable computer system 2001 are the same type of information and data that can conventionally be transferred and received over a public telephone wire network system. Additionally, in FIG. 2A, the existing telephone network could also be a packet-based network, utilized by some conventional portable computer systems. However, a wireless communication interface is utilized to communicate data and information between MPCS (modular portable computer system) 2001 and base station 32. Furthermore, nearly any wireless network can support the functionality to be disclosed herein.

Figure 2B:
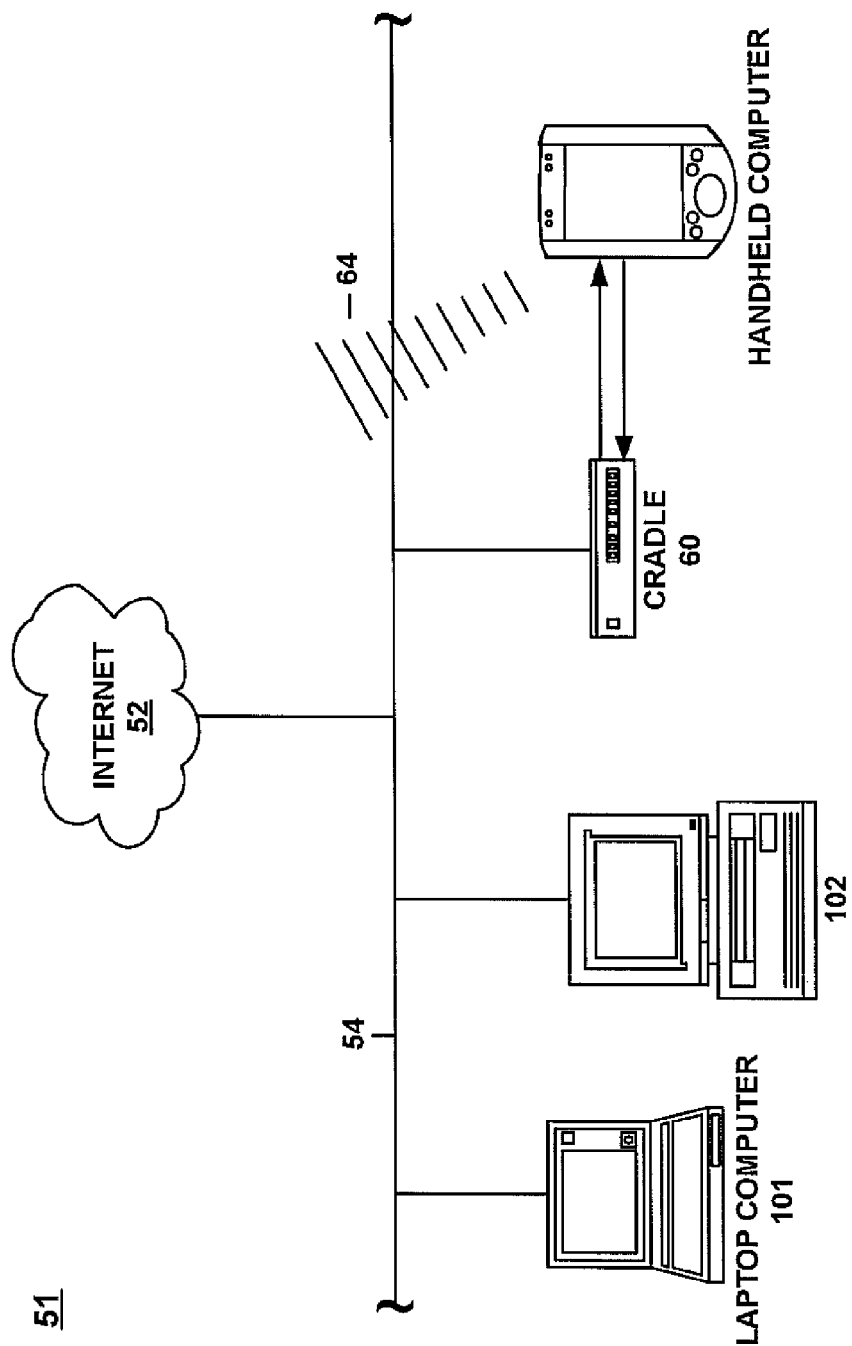
FIG. 2B is a block diagram of a portable computer system connected to other computer systems and the Internet via a cradle device, in accordance with one embodiment of the present invention.

FIG. 2B illustrated another embodiment of a system 51 that can be used in conjunction with various embodiments of the present invention. System 51 comprises a host computer system which can either be a desktop unit 101 or, alternatively, can be a laptop system 102. Optionally, one or more host computer systems can be used within system 51. Host computer systems 101 and 102 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with modular portable computer system 2001. Cradle 60 provides an electrical and mechanical communication interface between bus 54 (and anything coupled to bus 54) and modular portable computer system 2001 for two-way communications. Modular portable computer system 2001 may instead be coupled to host computer systems 101 and 102 via a wireless (radio) connection. Modular portable computer system 2001 also contains a wireless infrared communication mechanism 64 for sending and receiving information from other devices. Additionally, in FIG. 2B, the existing telephone network could also be a packet-based network, utilized by some conventional portable computer systems.

With reference to both FIGS. 2A and 2B, it is appreciated that MPCS 2001 can be used in a network environment combining elements of networks 50 and 51. That is, as will be seen below, modular portable computer system 2001 can include both a wireless infrared communication mechanism and a signal (e.g., radio) receiver/transmitter device.

It should be appreciated that in one embodiment of the present invention, nearly all advances in networking and intercommunication technologies can be readily implemented into modular portable computer system 2001, provided the components and circuitry for communication are disposed within one of the modular layers that can comprise a MPCS 2001.

EMBODIMENTS OF THE PRESENT INVENTION

It should be appreciated that the modular construction of MPCS (modular portable computer system) 2001 provides a separation of technologies, e.g., display, power supply, and baseline logic and communication electronics, from a common printed circuit board (PCB) and relocates them to individual modularly interconnected components. Accordingly, advances in one technology may be easily integrated with the other technologies in the MPCS 2001. Further, MPCS 2001 provides for multiple implementations of the same technologies, e.g., having both black and white display and color display functionality. These and numerous other features are described in the following.

Figure 3A:
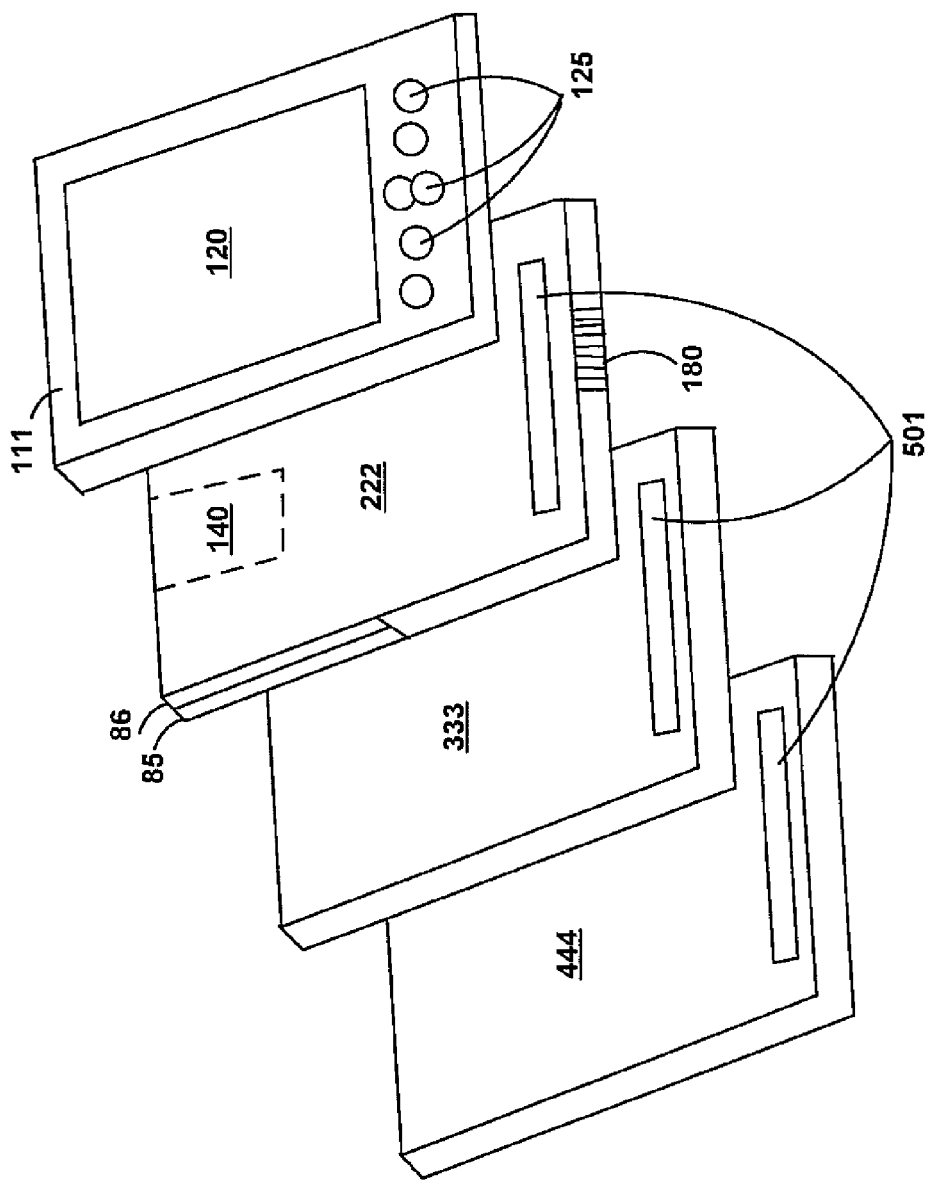
FIG. 3A is a front-angled illustrated view of a modular portable computer system showing multiple modular components and including a universal interconnect, in accordance with one embodiment of the present invention.

FIG. 3A shows an illustration of MPCS (modular portable computer system) 2001, in one embodiment of the present invention. In this embodiment, four component layers, layers 111, 222, 333, and 444, respectively, are depicted. It will be clearly shown that in other embodiments, a fewer number of layers or a greater number of layers may be implemented in MPCS 2001. The total combined thickness of an MPCS being one consideration when adding additional modular layers. When combined, the multiple modular layers can create nearly endless configuration possibilities and combinations.

It should be appreciated that by virtue of the modular layers having the same periphery dimensions, they can be attached to the next modular layer, by either sliding, snapping, twisting, or screwing them together, so that when modular layers are integrated together, they form a single handheld device. Further, an included universal interconnect provides full modular layer interconnectivity, such that each modular layer is enabled to communicate with other modular layers. Additionally, the modular layers may be user stackable.

In FIG. 3A, modular universal interconnect 501 is shown. Modular layers 111, 222, 333, and 444, and any subsequent modular layer, are each configured with one or more universal interconnects 501. Universal interconnect 501 provides an electronic and communicative pathway which enables modular interconnection and communication between and within the individual modular layers of MPCS 2001. In one embodiment, universal interconnect 501 is a contact bar, as shown in FIG. 3A, and is adapted to be placed in contact with other contact bars disposed accordingly on other modular layers. In another embodiment, universal interconnect 501 is configured as mated flexible contact 502 of FIGS. 4A-4D. The universal interconnects (501, 502) may provide mechanical and electronic contact.

Still referring to FIG. 3A, a top modular layer 111 has a display interface 120 visibly disposed thereon, in one embodiment of the present invention. Display interface 120 is adapted to provide user interaction with MPCS 2001. Also shown are one or more dedicated and/or programmable buttons 125 for selecting information and causing the computer system to implement functions. Display interface 120 is surrounded by a bezel or cover. Display interface 120 is a touch screen able to register contact between the screen and the tip of a stylus 86 (layer 222) or other acceptable contacting implement. Display interface 120 also shows a handwriting recognition pad or "digitizer" containing two regions 130a and 130b. Region 130a is for the drawing of alphabetic characters therein (and not for numeric characters) for automatic recognition, and region 130b is for the drawing of numeric characters therein (and not for alphabetic characters) for automatic recognition. A stylus 86 (layer 222) or other appropriate contacting implement is used for stroking a character within one of the regions 130a and 130b. The stroke information is then fed to a processor for automatic character recognition. Once a character is recognized, they are typically displayed on display interface 120 for verification and/or modification.

Still referring to FIG. 3A, display interface 120, in a preferred embodiment, is a flat panel display, color or black and white. Any number of display technologies can be used, e.g., liquid crystal display (LCD), field emission display (FED), light emitting diode (LED), plasma, electronic paper, for display interface 120. It should be appreciated that display interfaces having multiple display screens are also implementable in MPCS 2001. In one embodiment, modular layer 111 may include a display interface orientation controller 530 (FIG. 5) for providing orientation display control, such that when modular layer 111 of MPCS 2001 is rotated into a landscape (horizontal) position, the information displayed thereon will be also be re-oriented into a landscape mode. Conversely, when modular layer 111 is rotated into a portrait (vertical) position, orientation controller 530 re-orients the display into a portrait mode. It should further be appreciated that because of the individualization of the display component, additional functionality, such as graphic acceleration and dedicated graphic memory can be implemented with display interface 120 of first modular layer 111, thereby providing improved graphical performance. Additionally, advances within each of the display technologies described above may be integrated into top modular layer 111 of MPCS 2001, and can be replaced as needed.

FIG. 3A shows a modular layer 222 disposed beneath top modular layer 111. In one embodiment of the present invention, second modular layer 222 contains the baseline logic and communication electronics and circuitry which are utilized for operation, control, and communication of a MPCS 2001. Some of the baseline logic electronics disposed in layer 222 are shown in greater detail in the block diagram in FIG. 6. Baseline logic includes a processor, memory (volatile and non-volatile), data storage, and the like. In one embodiment of the present invention, modular layer 222 may have disposed thereon an external slot 140 adapted to receive data storage devices such as an SD (secure digital), an MMC (multi-media card), a memory stick, and the like. Modular layer 222 may also have disposed thereon a retractable or fixed antenna 85 for providing wireless transceiving functionality to MPCS 2001. Shown disposed proximal to antenna 85 is stylus 86 for contacting display interface 120. Also shown is communication interface 180. In one embodiment of the present invention, communication interface 180 is a serial communication port, but could also be of any number of well-known communication standards and protocols, e.g., parallel, SCSI (small computer system interface), Firewire (IEEE 1394), Ethernet, etc.

It should be appreciated that in one embodiment, multiple implementations of communication interface 180 may disposed upon multiple modular layers. For example, a USB interface 180 may be disposed upon modular layer 111 for connecting a digital camera to display interface 120.

Figure 6:
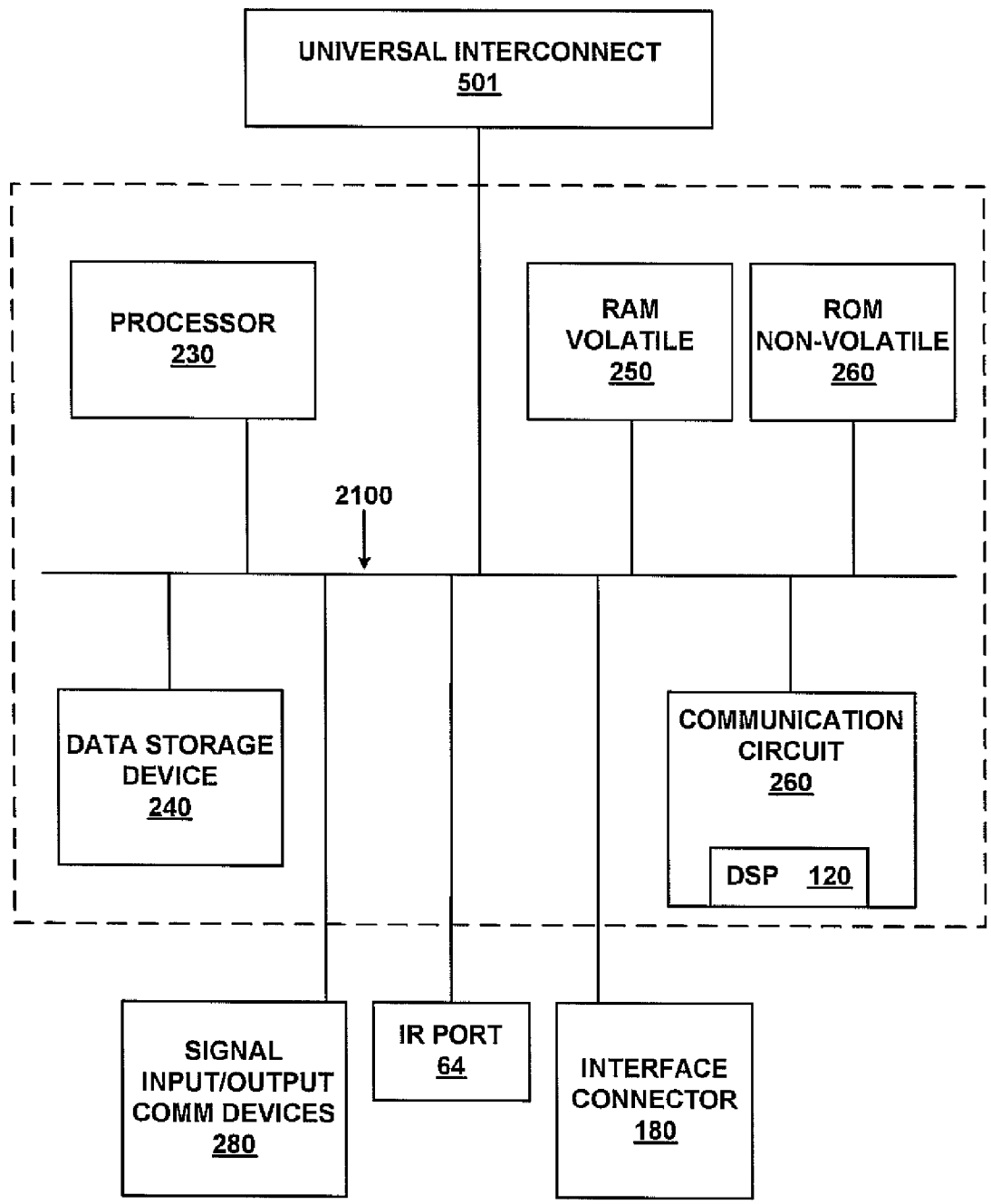
FIG. 6 is a block diagram of a modular layer including baseline logic and communication electronics of a modular portable computer system, in accordance with one embodiment of the present invention.

Referring still to modular layer 222 of FIG. 3A, modular layer 222 also contains the electronics and circuitry to enable communication. The block diagram of FIG. 6 shows those communication components therein disposed, in one embodiment of the present invention. Communication elements disposed within communication module layer 222 can include a communication circuit, a digital signal processor, a radio signal transceiver, a wired communication interface, and the like.

It should be appreciated that in another embodiment of the present invention, the baseline logic electronics can be disposed within one modular layer, for example, modular layer 222, while the communication electronics can be disposed within an additional modular layer, for example modular layer 333.

It should be further appreciated that because of the baseline logic electronics being, as described directly above, disposed in one modular layer in a component form factor separate from the communication electronics, upgrading of the baseline logic electronics, such as increasing processor speed or increasing memory, can be easily accomplished.

It should also be appreciated that in the above embodiment, because the communication electronics may be separate from the baseline logic electronics, advancements in communication technologies are easily implementable in a MPCS 2001, by replacing one or more layers as needed.

It should be appreciated that in yet another embodiment, data storage such as, e.g., miniature hard disk drives or magnetic, programmable, or optical data storage may be implemented as an individualized modular layer within a MPCS 2001. Further, by virtue of the modular construction, advancements in data storage technology may readily be integrated into a MPCS 2001.

Still referring to FIG. 3A, a modular layer 333 is shown disposed beneath modular layer 222. In this embodiment, modular layer 333 is configured as an peripheral modular layer for providing added functionality to a MPCS 2001. In one embodiment, modular layer 333 is an MP3 player. In another embodiment, modular layer 333 is a digital camera. In another embodiment, modular layer 333 is a printing device. In yet another embodiment, modular layer 333 can be a keyboard. In fact, by virtue of the modular construction of a MPCS 2001, nearly any peripheral functionality may be added to a MPCS 2001.

Further, in one embodiment, multiple peripheral devices may be interconnected within a MPCS 2001 by the addition of multiple separate peripheral modular layers. For example, modular layer 333 may be configured as an MP3 player. Another modular layer may be added to modular layers 111, 222, 333, and 444) and may be configured as a digital camera. Yet another interconnectable modular layer may be configured as a printing device and added to the above. Still another interconnectable modular layer may be configured as a keyboard and added to the above. Thus, in this embodiment, MPCS 2001, as seen in FIG. 3A, would have seven modular layers interconnected and having the appearance of a single handheld computer system.

In yet another embodiment of the present invention, interconnectable modular layer 333 may be dummy modular layer, dummy meaning that the modular layer is unpowered. A dummy modular layer may provide, for example, storage space for a note pad, a place for a stylus 86 (instead of layer 222 of FIG. 3A), a place for storing SD cards or MMCs, and the like. It should be noted that when a modular layer is configured as a dummy modular layer, and as such unpowered, a universal interconnect 501 must be present to maintain full electronic and communicative interconnectabililty among all present modular layers.

With reference to FIG. 3A, modular layer 444 is shown disposed beneath layer 333. In one embodiment, modular layer 444 contains the power source for supplying power to MPCS 2001. Layer 444 can contain one or more replaceable batteries, one or more rechargeable batteries (fixed or removable), or a combination thereof. In one embodiment, the thickness of layer 444, is in proportion to the amount of power contained therein. For example, a thinner layer 444 would contain less power, and, therefore, a shorter period of operation before depletion of operational power, than a thicker layer 444. A thicker modular layer 444 would have an increased amount of power, and accordingly, would provide more operational power to more interconnected modules for a longer period of time. In another embodiment, modular layer 444 may also contain solar recharging functionality for decreasing the frequency with which the rechargeable batteries are recharged.

It should be appreciated that in one embodiment, modular layer 111 can contain not only the display technology as described above, but also the baseline logic and communication electronics contained within layer 222. As such, a modular layer containing the power source, such as that shown in layer 444 would be coupled thereto.

It should also be appreciated that with the exception of the display interface being viewably disposed within the top modular layer, that being layer 111 in this example, universal interconnector 501 enables the order of any additional modular layers disposed beneath the top modular layer to be arbitrary and subject to the desires of a user. For example, if layers 111, 222, 333, and 444 were all implemented, layer 333 could be disposed below layer 444 or above layer 222, or the like. Because user interaction is enabled through a display interface, display interface 120 in the present embodiment, it is desired that display interface 120 be disposed on the top most modular layer of MPCS 2001.

Figure 3B:
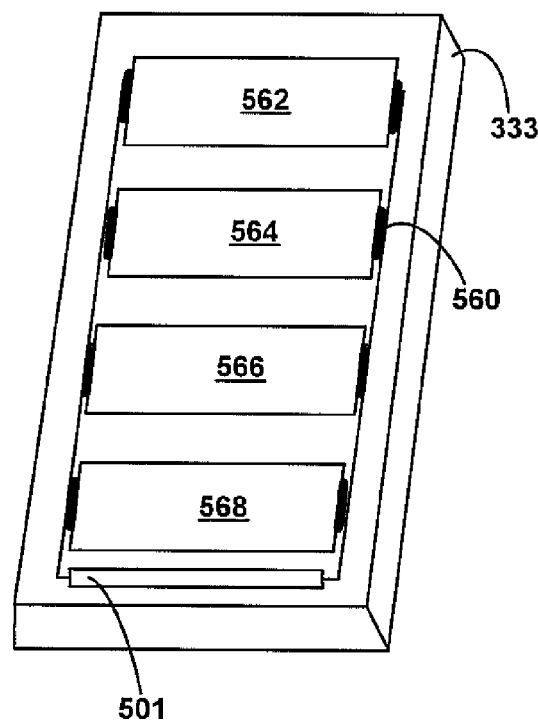
FIG. 3B is a front-angled illustrated view of a modular carrier layer, in accordance with one embodiment of the present invention.

In another embodiment, a modular layer, e.g., modular layer 333 may be configured as a carrier layer comprising sub-layer bays or slots, as shown in FIG. 3B. In FIG. 3B, modular layer 333, in this embodiment, is shown to include universal interconnect 501. Also shown in FIG. 3B, modular layer 333 is also shown to include a sub-layer slot interconnect 560, which provides a communicative and electronic connection with each of the sub-layer slots and the universal interconnect 501 disposed therein. This embodiment provides for those components and or modules that are of a size that does not warrant an entire layer. For example, components or modules that may not require an entire layer can include, but are not limited to, serial ports, memory, Bluetooth enabled devices, flash card slots, modem, radios, and the like.

Still referring to FIG. 3B, modular layer 333, in one embodiment, can be configured with fixed type sub-layer slots, such that the functions provided cannot be changed. For example, the sub-layer slots can be configured such that slot 562 is a memory module, slot 564 is a modem, slot 566 is a serial module, and slot 568 is a mouse. This configuration should not be construed as limiting, but exemplary with regard to types of modules that can be included.

Still referring to FIG. 3B, in another embodiment, modular layer 333 can be configured with user configurable sub-layer slots which are interchangeable. For example, a Bluetooth enabled module can be connected in slot 562, 564, 566, or 568. Further, a mouse module can be connected in one of the open sub-layer slots. In another example, a module comprising one function, such as one listed above, may be readily removed and replaced with another module comprising a different function, such that the sub-layer slots provide nearly endless configuration possibilities and combinations with respect to those modules or components which do not require an entire modular layer.

Figure 3C:
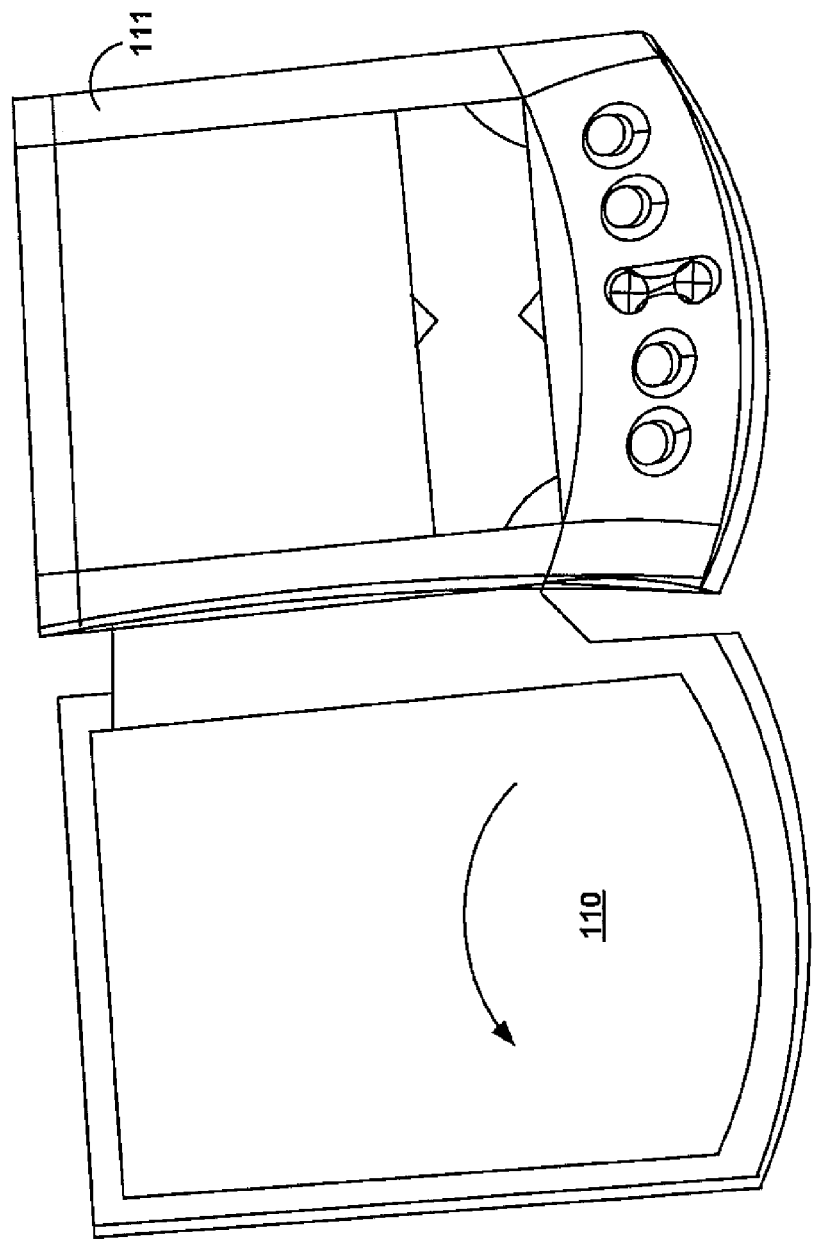
FIG. 3C is a front-angled illustrated view of a top modular layer of a modular portable computer system which has a hinged front cover, in accordance with one embodiment of the present invention.

In another embodiment, modular layer 111 of MPCS 2001, may be configured with a hinged front cover 110, as seen in FIG. 3C. In FIG. 3C, front cover 110 is adapted as rotatable about a hinge or axis, as indicated by arrow. Front cover 110 is adapted to provide protection to display interface 120 against incidental contact and/or damage. In another embodiment, front cover 110 may be communicatively and electronically coupled to modular layer 111. When so configured, front cover 110 may provide additional functionality, e.g., additional display panels, improved transceiving capabilities, and the like, to MPCS 2001.

It should be appreciated that modular layers 222 and 333 (and other modular layers when analogously disposed), shown as interposed between top modular layer 111 and a bottom layer (modular layer 444 in this embodiment), are all interconnected via universal interconnect 501. Further, those modular layers interposed between a top modular layer and a bottom layer need only an exposed periphery edge encasing structure sufficient to provide to assure electronic and communicative integrity, meaning that only the outer edges of those peripheral modular layers (the top and bottom layers are not part of the peripheral) need be finished. Additionally, if the peripheral modular layer exposes connectors, indicators, enunciators, switches, or the like, they are built into an exposed edge. Further, if a peripheral modular layer requires a certain amount of power, a power source modular layer which provides that minimum power needs to be interconnected thereto. To reiterate, a thicker modular layer 444 (in this embodiment, the power source layer), equates to a greater amount of supplied power.

It should be appreciated that by virtue of the interconnectability of the modular layers, no matter the number of modular layers utilized within MPCS 2001, it is basically the same device, only thicker. The number of peripheral modular layers that may be stacked together is limited mainly by user preference with regard to overall thickness of MPCS 2001 and the selected battery capacity.

Figure 4A:
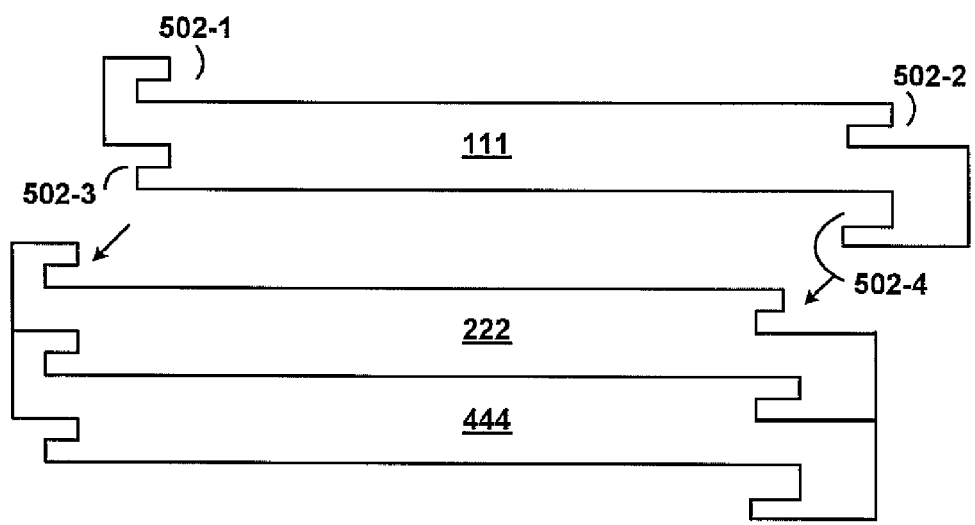
FIG. 4A is an illustration showing modular layers of a modular portable computer system being interconnected, in accordance with one embodiment of the present invention.

FIG. 4A is another example of universal interconnect 501, a physical and electrical interconnect implemented to provide the interconnection between modular layers in a MPCS 2001. In this embodiment, universal interconnect 501 is configured as mated flexible contacts 502-1 502-4 which are disposed on the top surface, and mated flexible contacts 502-2 and 502-3 which are disposed upon the bottom surface of each modular layer, respectively. When properly coupled, contacts 502-1 and 502-3 are contacting each other, and accordingly, so are contacts 502-2 and 502-4. Each of the mated flexible contacts 502 are disposed near peripheral edges of each of the layers, 111, 222, and 444 and provide the communicative and electronic pathway which enables modular layer intercommunication.

Still referring to FIG. 4A, in this example modular layer 111 is analogous to modular layer 111 which contains display interface 120. In one embodiment, optional front cover 110 of FIG. 3B may be included with modular layer 111. Further, modular layer 222, in this instance, contains the combined baseline logic electronics and the communication elements (layer 222 and layer 333, respectively, of FIG. 3A). Accordingly, layer 444 contains a power source analogous to the modular layer 444 of FIG. 3A.

Figure 4B:
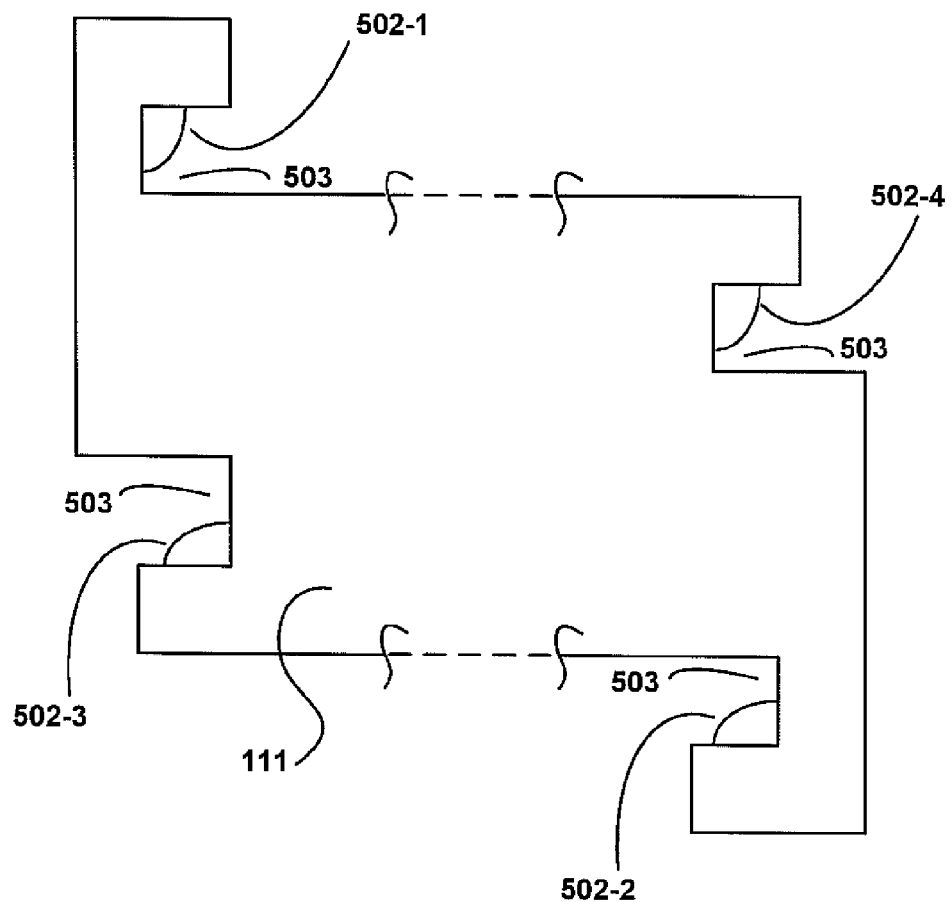
FIG. 4B is an illustrated cross-section of a modular layer showing a universal interconnect, in one embodiment of the present invention.

FIG. 4B, an illustrated cross-section of a modular layer shows the disposition of mated flexible contacts 502-1, 502-2, 502-3, and 504-4, in one embodiment of the present invention. In this embodiment, each of the mated flexible contacts are disposed within an interlocking design utilizing undercut areas 503 which are adapted to provide positive interlocking of the modular layers.

Figure 4C:
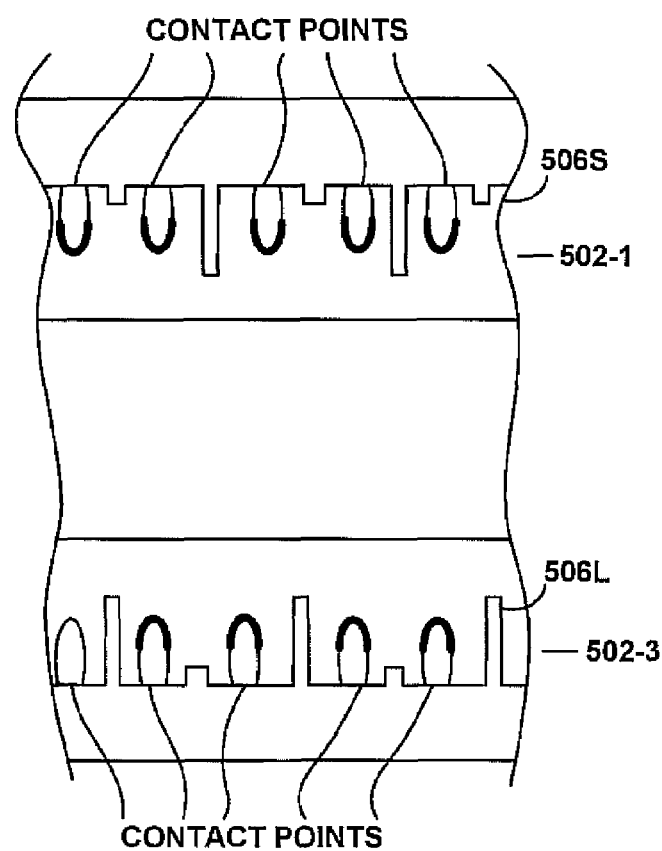
FIG. 4C is an illustrated expanded view of the universal interconnect of FIG. 4B.

FIG. 4C is an illustrated top view of mated flexible contacts 502-1 of one modular layer and mated flexible contacts 502-3 and another layer prior to contact. The contact points of 502-1 are designed to be in contact with the contact points of 502-3. Alignment enablers 506L (long) and 506S (short) are alternatingly interposed between the contact points to further provide a positive alignment of the coupled modular layers.

Figure 4D:
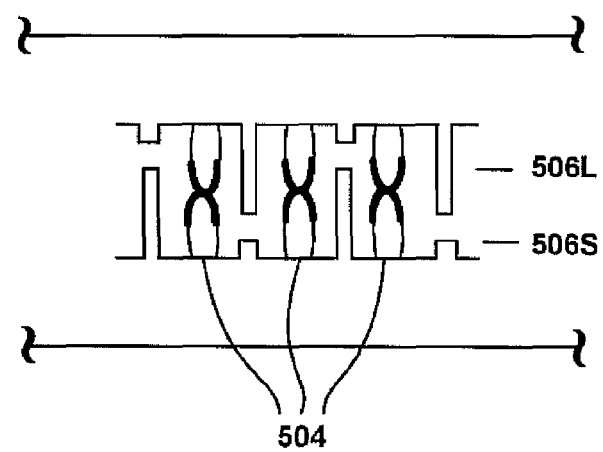
FIG. 4D is an illustrated view showing coupled universal interconnects, in one embodiment of the present invention.

FIG. 4D depicts two layers as being properly aligned and therefore the mated flexible contacts of FIG. 4C are in correct contact. This is indicated by the darkened areas 504. Additionally, because of alignment enablers 506L and 506S, mated flexible contacts 502-1 and 502-3, one embodiment of universal connector are prevented from being excessively contacted by the other. Excessive contacting could damage the contacts such that the flexibility of the contact may be lost and render the modular layer inoperative.

Figure 5:
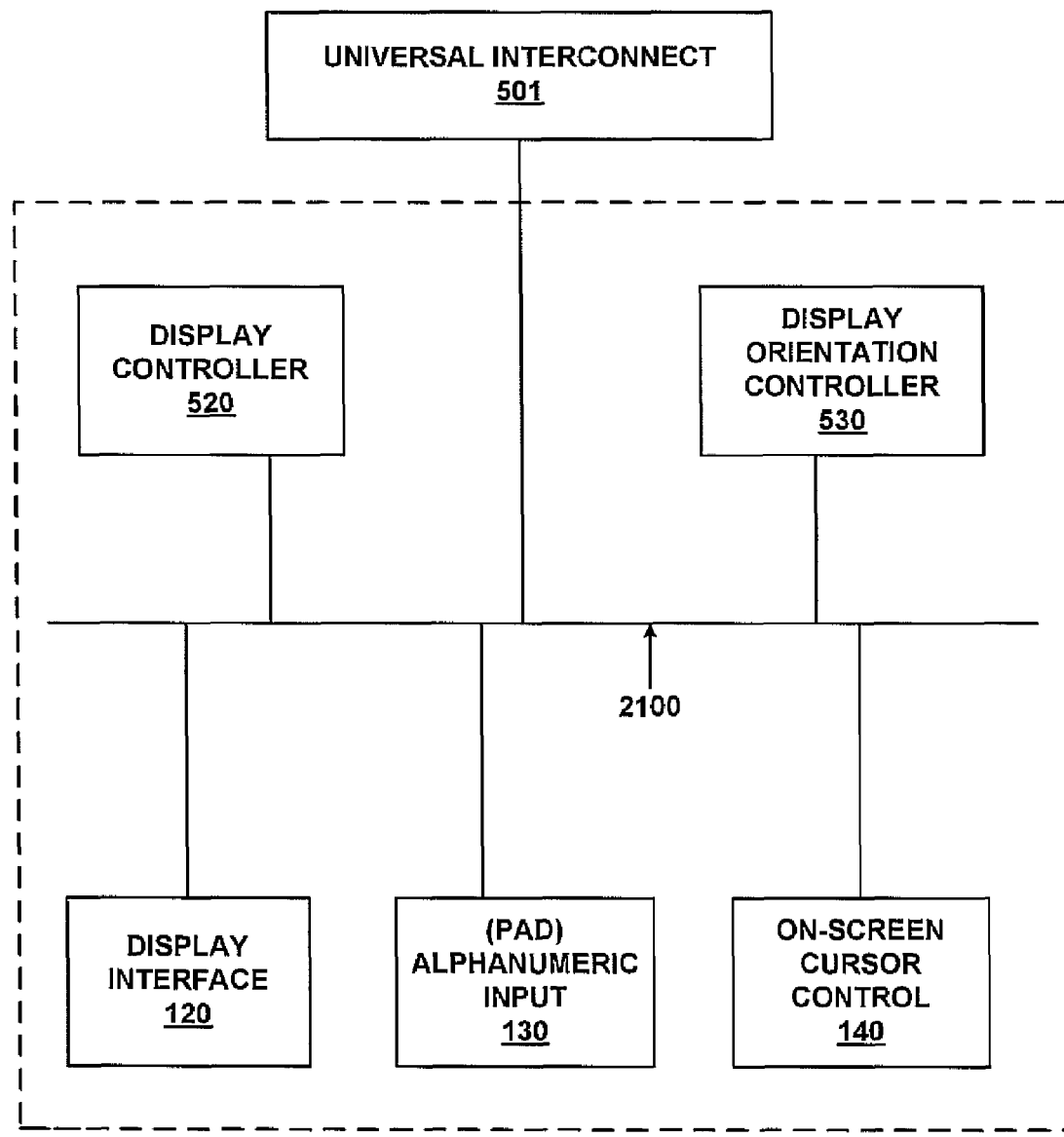
FIG. 5 is a block diagram of a top modular layer including a display interface of a modular portable computer system, in accordance with one embodiment of the present invention.

FIG. 5 is a block diagram of a modular layer 111, which in one embodiment of the present invention, contains display interface 120 of FIG. 3A. Modular layer 111 includes an address/data bus 2100, for communicating information and is coupled with universal interconnect 501. Modular layer 111 also includes a display controller 520 for controlling display interface 120 and is coupled with bus 2100. Display orientation controller 530 is also coupled to bus 2100 and provides orientation control of display interface 120. For example, if MPCS 2001 is rotated into a landscape (horizontal) orientation, display orientation controller 530 will automatically place display interface 120 into a landscape mode, and will return the display interface 120 to the usual portrait mode when MPCS 2001 is reoriented into portrait (vertical) position.

Still referring to FIG. 5, also included in modular layer 111 is an optional alphanumeric input device 130 that in one implementation is a handwriting recognition pad "digitizer" having regions 130a and 130b (FIG. 3A), for instance. Alphanumeric input device 130 can communicate information and commands to processor 230 (FIG. 6) via universal interconnect 501. Modular layer 111 also includes an optional cursor control or directing device (on-screen cursor control 140) coupled to bus 2100 for communicating user input information and command selections to processor 101 (FIG. 6). In one implementation, on-screen cursor control 140 is a touch screen device incorporated with display interface 120. On-screen cursor control 140 is capable of registering a position on display interface 120 where a stylus makes contact. The display interface 120 utilized with MPCS 2001 may be a liquid crystal display device, a field emission display device (also called a flat panel CRT), a light emitting diode display device, an electronic paper display device or other display device suitable for generating graphic images and alphanumeric characters recognizable to the user. In the preferred embodiment, display interface 120 is a flat panel display.

FIG. 6 is a block diagram of modular layer 222, which in one embodiment includes the baseline logic electronics for operation of MPCS 2001. Modular layer 222 includes an address/data bus 2100 for communicating information, a central processor 230 coupled with the bus for processing information and instructions, a volatile memory 250 (e.g., random access memory, RAM) coupled with the bus 2100 for storing information and instructions for the central processor 230 and a non-volatile memory 260 (e.g., read only memory, ROM) coupled with the bus 2100 for storing static information and instructions for the processor 230. Modular layer 222 further includes an optional data storage device 240 (e.g., SD card or MMC) coupled with the bus for storing information and Instructions.

Still referring to FIG. 6, modular layer 222 also includes, in one embodiment, the communication electronics for enabling communication between MPCS 2001 and other computer systems and/or computer networks. Modular layer 222 includes a signal/transmitter/receiver device 280, which is coupled to bus 2100 for providing a physical communication link between MPCS 2001, and a network environment (e.g., network environments 50 and 51 of FIGS. 2A and 2B, respectively). As such, signal transmitter/receiver device enables central processor 230 to communicate wirelessly with other electronic systems coupled to the network. It should be appreciated that within the present embodiment, signal transmitter/receiver device 280 is coupled to an antenna 85 (layer 222 of FIG. 3A) and provides the functionality to transmit and receive information over a wireless communication interface. It should be further appreciated that the present embodiment of signal transmitter/receiver device 280 is well suited to be implemented in a variety of ways. For example, signal device 280 could be implemented as a modem.

Modular layer 222 also includes a communication circuit 260 couple to bus 2100. Communication circuit 260 includes an optional digital signal processor (DSP) 120 for processing data to be transmitted or data that are received via signal transmitter/receiver device 280. Alternatively, processor 230 can perform some or all of the functions performed by DSP 120. Modular layer 222 also includes interface connector, analogous to interface connector 180 modular layer 222 of FIG. 3A, and provides a communication interface for wired connections, such as connecting with a cradle 60 of FIG. 2B. Modular layer 222 further includes an IR port 64 (FIG. 2B) for infra-red wireless communication. In one embodiment, IR port 64 may be configured with Bluetooth functionality.

It should be appreciated that although the baseline logic and communication electronics are shown to be disposed within modular layer 222, in another embodiment of the present invention, the baseline logic electronics can be disposed on one individual modular layer while the communication electronics can be disposed on another individual modular layer. Having each technology disposed within separate modular layers provides for easier upgrading or replacement when necessary.

Figure 7:
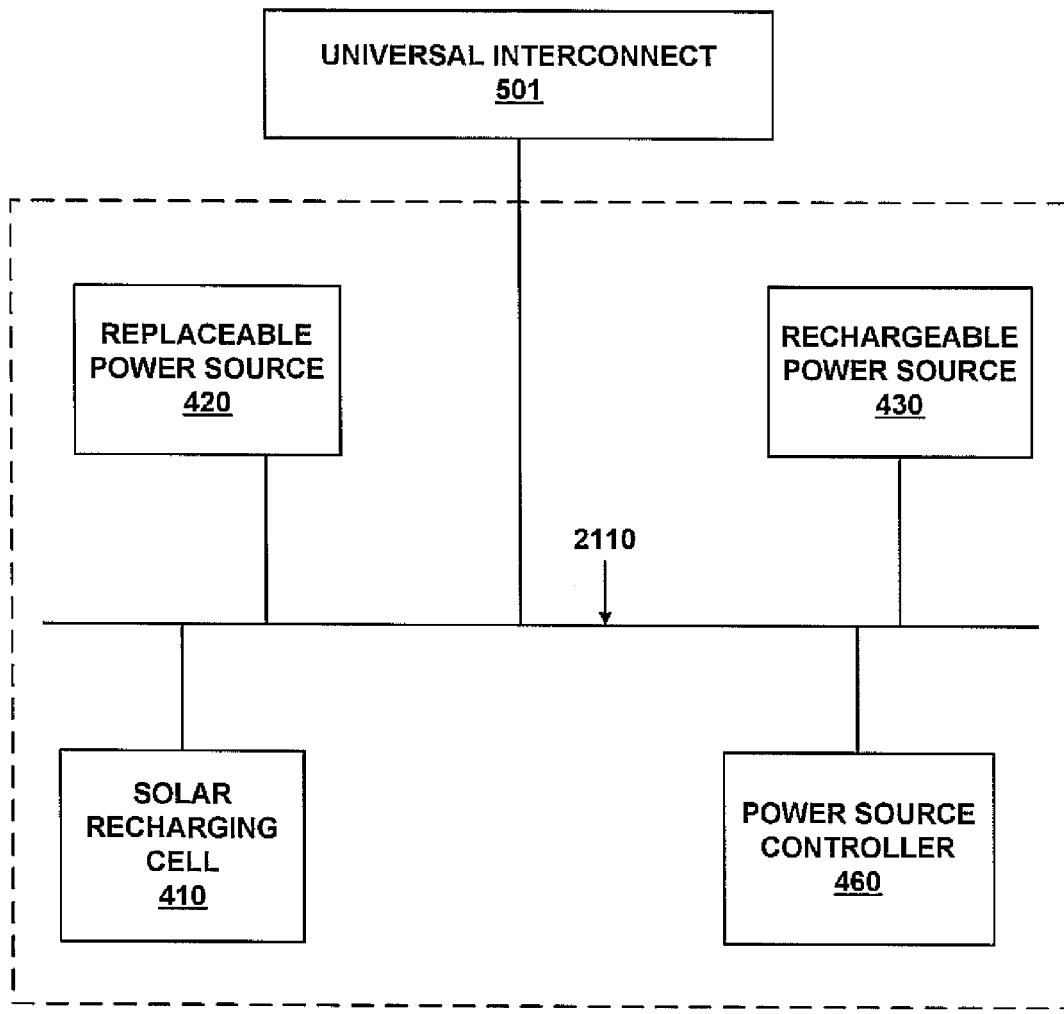
FIG. 7 is a block diagram of a modular layer including a power source component of a modular portable computer system, in accordance with one embodiment of the present invention.

FIG. 7 is a block diagram of modular layer 444, which in one embodiment is a power source for supplying operating power to the modular layers which comprise MPCS 2001. In one embodiment, modular layer 444 is shown to include a replaceable power source 420, a rechargeable power source 430, a solar recharging cell 410, which are coupled to bus 2110. Solar recharging cell 410 provides constant recharging when exposed to light, and may reduce the frequency with which the rechargeable power source is recharged. Bus 2110 is coupled to universal interconnect 501 and provides the electronic pathway for power to be distributed to the other modular layers, when coupled with the MPCS 2001. Also coupled to bus 2110 is power source controller 460 for controlling the distribution of power to the various modular layers. While the present embodiment depicts modular layer 444 as having three power sources, in another embodiment, modular layer 444 may include one power source or a combination thereof.

It should be appreciated that the thickness of modular layer 444 (FIG. 3A and FIG. 7) is in proportion to the amount of operating power supplied. When modular layer 444 is thin in nature, less operating power is provided. Conversely, when modular layer 444 is thicker in nature, a greater amount of operating power is supplied. Having a greater amount of available operating power is most advantageous when multiple peripheral modular layers are coupled with MPCS 2001.

Concluding, the present invention provides a modularly constructed portable computer system. Further, by separating the technologies into individual modular layers, improvements in the technology relative to the modular layer can be readily implemented. Additionally, by having a power source with varying amounts of operating power, a user can safely and confidently operate a multitude of modular layers at one time.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A portable computer system comprising:
a plurality of modular layers each providing an electronic function and each connected mechanically and electrically to at least one other modular layer, wherein each modular layer is substantially of the same physical profile in width and length, wherein each modular layer comprises a universal interconnect for mechanically coupling and communicatively coupling said plurality of modular layers, wherein said universal interconnect of each modular layer comprises at least one electrical contact for implementing a common signal interface, wherein said universal interconnect is operable to communicate data between at least two of said plurality of modular layers, wherein said plurality of modular layers are adjacently disposed to form one integrated computer system, and wherein each of said plurality of modular layers is adapted to be interchangeable with one or more replacement modular layers such that said portable computer system is modularly upgradeable.

2. The computer system of claim 1, wherein a first modular layer is top-most positioned and comprises display and mechanical input/output functionality.

3. The computer system of claim 1, wherein a second modular layer provides power to other modular layers.

4. The computer system of claim 1, wherein a third modular layer provides baseline functionality.

5. The computer system of claim 4, wherein a fourth modular layer provides peripheral functionality.

6. The computer system of claim 5, wherein said peripheral functionality is wireless communication.

7. The computer system of claim 5, wherein said peripheral functionality is a music player.

8. The computer system of claim 5, wherein said peripheral functionality is extended memory.

9. The computer system of claim 5, wherein said peripheral functionality is digital camera functionality.

10. The computer system of claim 1, wherein said common signal interface is operable to communicate power signals, address signals, and data signals.

11. A portable computer system comprising:
a top modular layer comprising a display and adapted to be electrically interconnected with other modular layers;
a second modular layer electrically interconnected with said top modular layer and said other modular layers, for providing a power source;
a third modular layer electrically interconnected with said top modular layer and said second modular layer for providing baseline logic electronics and communication components; and
a universal interconnect for providing interconnection of each said modular layer with each of said other modular layers, said universal interconnect disposed at least once on each modular layer, wherein said universal interconnect comprises at least one electrical contact for communicatively coupling said top modular layer, said second modular layer, and said third modular layer, and wherein said universal interconnect is operable to communicate data between at least two of said top, second, and third modular layers;
wherein said top modular layer, said second modular layer, and said third modular layer are each adapted to be interchangeable with one or more replacement modular layers, so as to allow for modular upgradeability of said portable computer system.

12. The portable computer system of claim 11 further comprising additional modular layers adapted to be interconnected with said portable computer system, said additional modular layers disposed beneath said top modular layer and to provide added functionality to said portable computer system.

13. The portable computer system of claim 11 wherein said top modular layer further comprises a plurality of dedicated/programmable buttons for selecting information and implementing functions.

14. The portable computer system as recited in claim 13 wherein said second modular layer further comprises a physical thickness that is in proportion to the amount of operating power supplied, such that a thicker second modular layer equates to a greater supply of operating power.

15. The portable computer system of claim 13 wherein said dedicated/programmable buttons are disposable upon each of said modular layers, dependent upon requirements of each of said modular layers.

16. The portable computer system of claim 11 wherein said third modular layer is interposed between said top modular layer and said second modular layer, such that said second modular layer is a bottom modular layer.

17. The portable computer system of claim 11 wherein said baseline logic electronics further comprise:
a bus, interconnectable with said universal interconnect;
a processor coupled to said bus for processing instructions and data;
a memory unit for storing information utilized by said processor and said other modular layers.

18. The portable computer system as recited in claim 11 wherein said communication components further comprise:
a bus, interconnectable with said universal interconnect and coupled with said bus of said baseline logic electronics;
a communication circuit coupled to said bus for providing analog wireless communication;

a digital signal processor coupled to said bus for providing digital wireless communication; and a communication interface coupled to said bus for providing wired communication.

19. The portable computer system of claim 11 wherein each said modular layer is of an equivalent width and length so as to be form compatible and wherein the thickness of each said modular layer varies.

20. The portable computer system of claim 11 wherein each said modular layer further comprises an encasing structure to hold said modular layer.

21. The portable computer system of claim 11 wherein said third modular layer and said other modular layers, said interposed between said top modular layer and said second modular layer, further comprise exposed connectors and indicators and enunciators and switches, said exposed connectors and said indicators and said enunciators and said switches are disposed on an exposed edge surface of said interposed layer.

22. The portable computer system of claim 11 wherein said top modular layer further comprises a hinged front cover configured to rotate about a hinged axis and adapted to provide protection for said display.

23. A portable electronic device comprising:

a top modular layer comprising a display adapted to be electrically interconnected with other modular layers;

a bottom modular layer electrically interconnected with said top modular layer and said other modular layers, for providing a power source to supply operating power;

a first interposable modular layer electrically interconnected with said top modular layer and said bottom modular layer for providing baseline logic electronics and communication components; and a universal interconnect for providing interconnection between each modular layer, said universal interconnect disposed at least once on each modular layer, and wherein said universal interconnect comprises at least one electrical contact for communicatively coupling said top modular layer, said bottom modular layer, and said first interposable modular layer, and wherein said universal interconnect is operable to communicate data between at least two of said top, bottom, and first interposable modular layers;

wherein said first interposable modular layer is adapted to be interchangeable with one or more replacement modular layers, so as to allow for modular upgradeability of said modular electronic device.

24. The portable electronic device of claim 23 further comprising additional interposable modular layers adapted to be interconnected with said modular layers and providing peripheral functionality.

25. The portable electronic device of claim 23 wherein said top modular layer further comprises a plurality of dedicated/programmable buttons for selecting information and implementing functions.

26. The portable electronic device of claim 23 wherein said bottom modular layer is of a physical thickness that is in proportion to the amount of operating power supplied.

27. The portable electronic device of claim 23 wherein said baseline logic electronics further comprise:

a bus, interconnectable with said universal interconnect;

a processor coupled to said bus for processing instructions and data; and a memory unit for storing information utilized by said processor.

28. The portable electronic device of claim 23 wherein said communication components further comprise:

a bus, interconnectable with said universal interconnect and coupled with said bus of said baseline logic electronics;

a communication circuit coupled to said bus for providing analog wireless communication;

a digital signal processor coupled to said bus for providing digital wireless communication; and a communication interface coupled to said bus for providing wired communication.

29. The portable electronic device of claim 23 wherein each said modular layer is of an equivalent width and length so as to be form compatible and wherein the thickness of each said modular layer can vary in accordance with the functionality provided therefrom.

30. The portable electronic device of claim 23 wherein said top modular layer and said bottom modular layer further comprise an encasing shell for providing form compatibility within said modular electronic device and for ensuring modular layer integrity and for facilitating modular layer interconnectabililty, said encasing structure disposed on front and back and peripheral edges of said top and bottom modular layer.

31. The portable electronic device of claim 23 wherein each interposed modular layer further comprises an exposed periphery encasing shell for providing form compatibility within the modular electronic device and to hold said interposed modular layer along peripheral edges thereof.

32. The portable electronic device of claim 23 wherein said interposable modular layers further comprise exposed connectors and indicators and enunciators and switches disposed on an exposed edge surface of said interposed layer.

* * * * *